Feb. 14, 1928.

C. M. CONRADSON 1,659,426

MILLING MACHINE

Original Filed March 20, 1920    6 Sheets-Sheet 1

Inventor
CONRAD M. CONRADSON
By *[signature]*
Attorneys

Feb. 14, 1928.

C. M. CONRADSON 1,659,426

MILLING MACHINE

Original Filed March 20, 1920    6 Sheets-Sheet 2

Inventor
CONRAD M. CONRADSON
By Paul H Paul
Attorneys

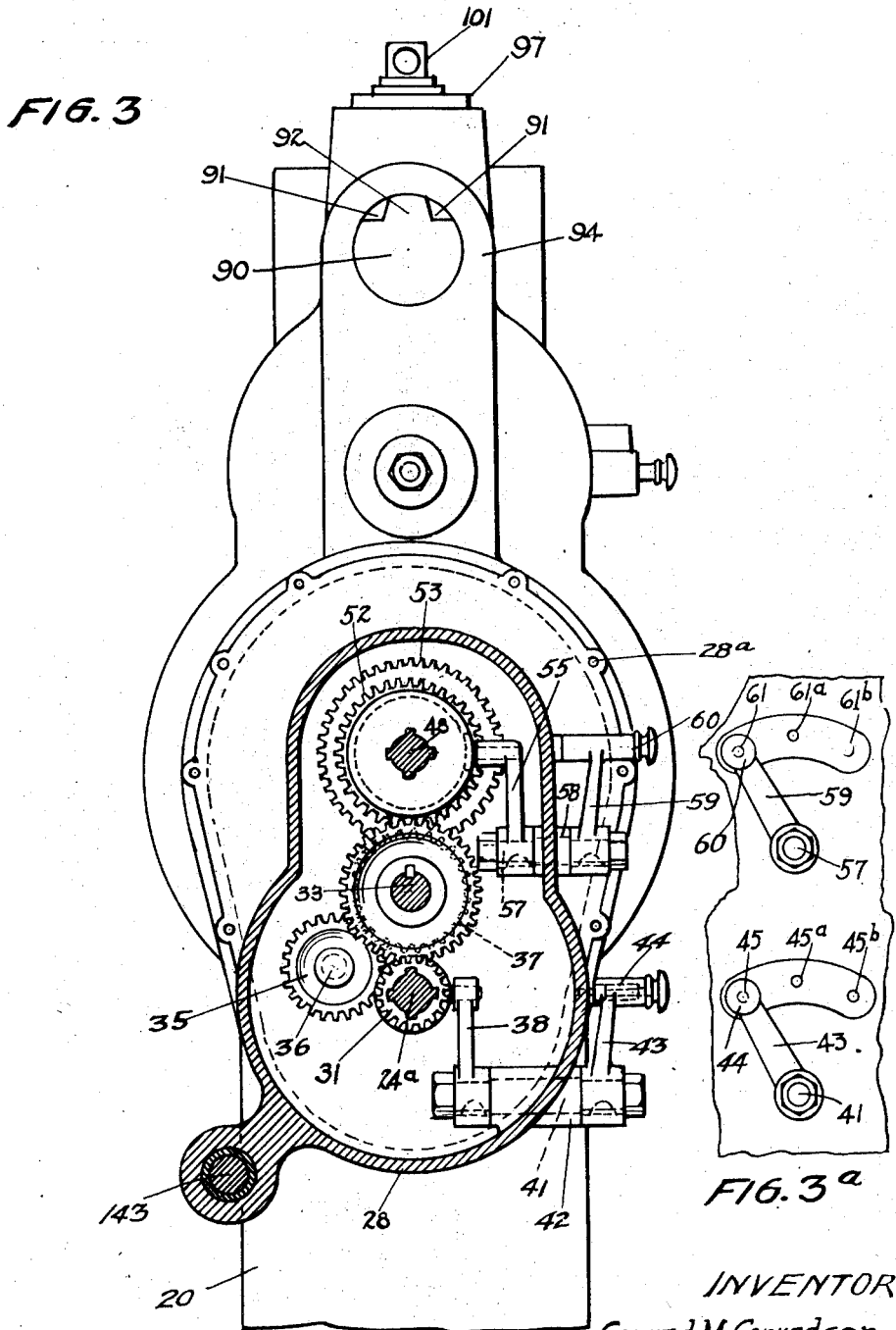

Feb. 14, 1928.
C. M. CONRADSON
MILLING MACHINE
Original Filed March 20, 1920   6 Sheets-Sheet 4
1,659,426
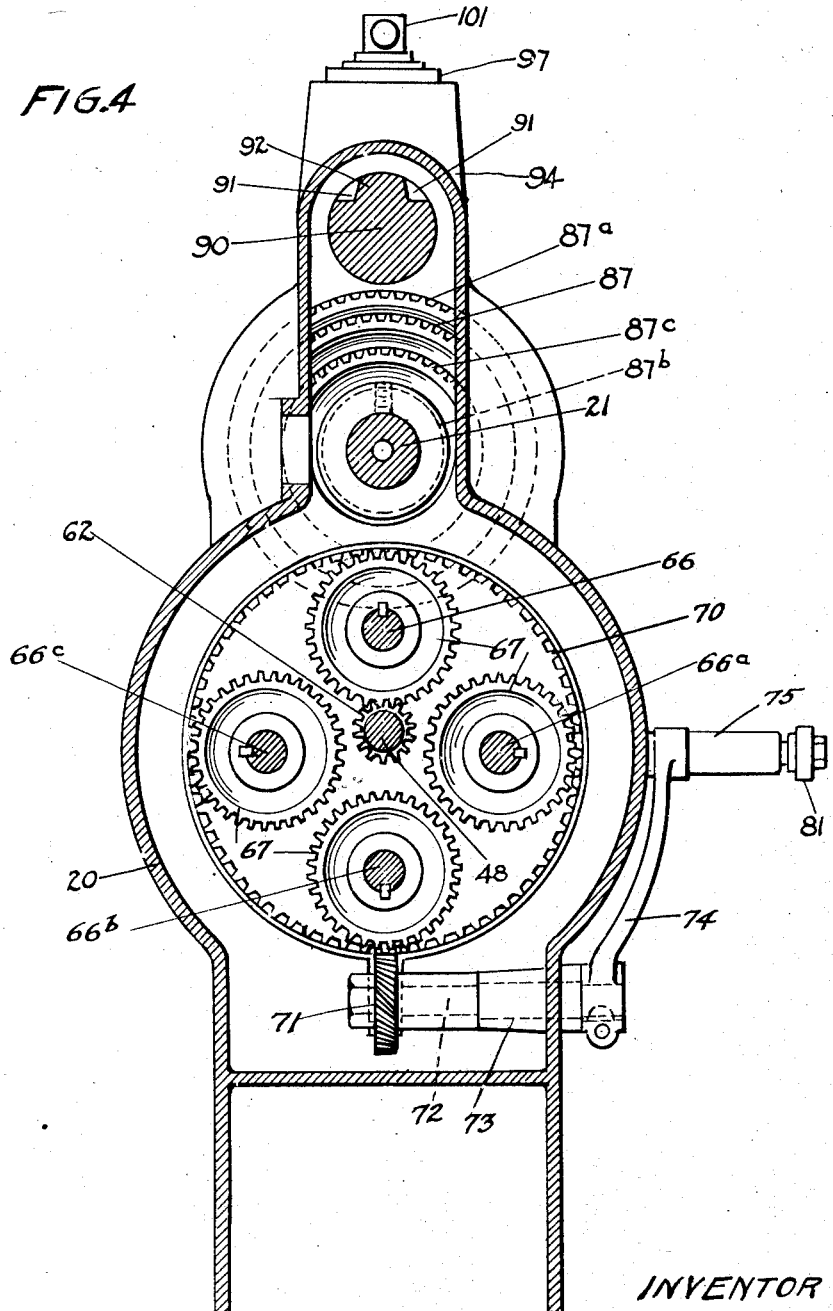
INVENTOR
Conrad M. Conradson
By
HIS ATTORNEYS

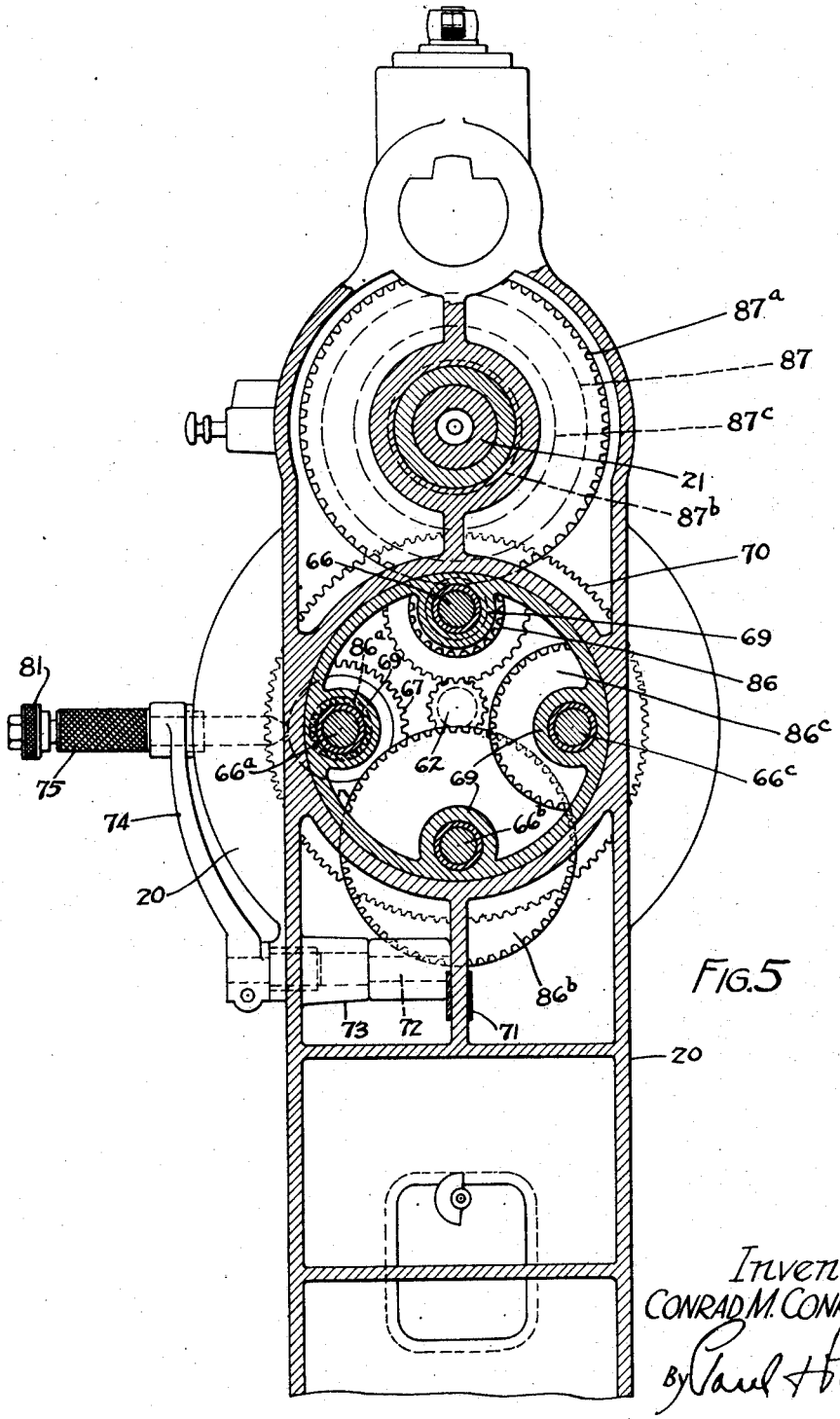

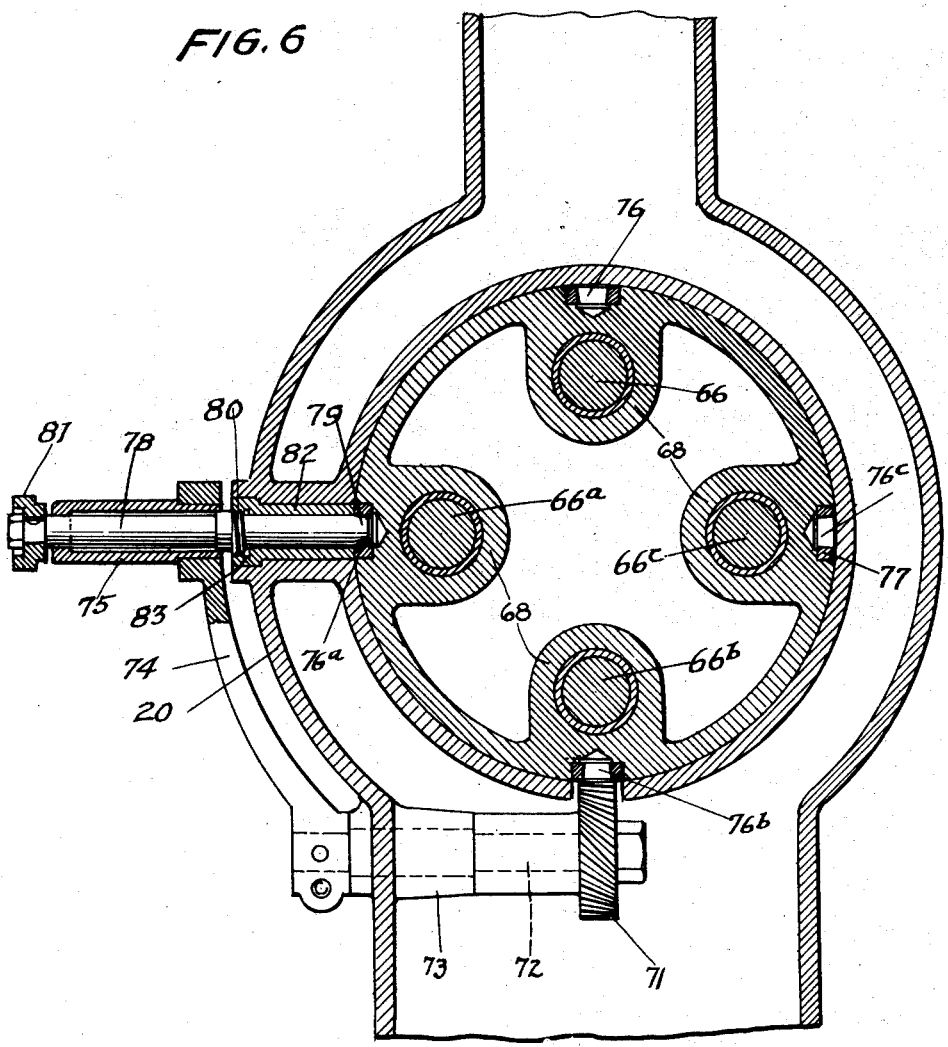

Patented Feb. 14, 1928.

1,659,426

UNITED STATES PATENT OFFICE.

CONRAD M. CONRADSON, OF MADISON, WISCONSIN, ASSIGNOR TO JOSEPH T. RYERSON & SON, OF CHICAGO, ILLINOIS, A CORPORATION OF ILLINOIS.

MILLING MACHINE.

Application filed March 20, 1920, Serial No. 367,529. Renewed February 1, 1924.

My invention relates to improvements in variable speed drive mechanism for the working spindle of a milling machine and to variable speed mechanism for feeding the work to the milling cutter in both horizontal and vertical directions, coupled with automatic stop and traverse mechanism for the feed table of the machine.

The objects of the invention are:

First, to provide a driving mechanism of simple, durable and compact construction and a powerful, accurate, and silent power transmission from the motive power shaft to the working spindle of the machine.

Second, to provide a variable speed and power transmission that will be positively and instantly responsive to the speed-shifting medium and that may be shifted without the use of clutches to various speeds and reverse while the machine is running.

Other objects will appear from the following detailed description, taken in connection with the accompanying drawings.

The invention consists in various constructions and combinations, all as hereinafter described and particularly pointed out in the claims.

Figure 1:
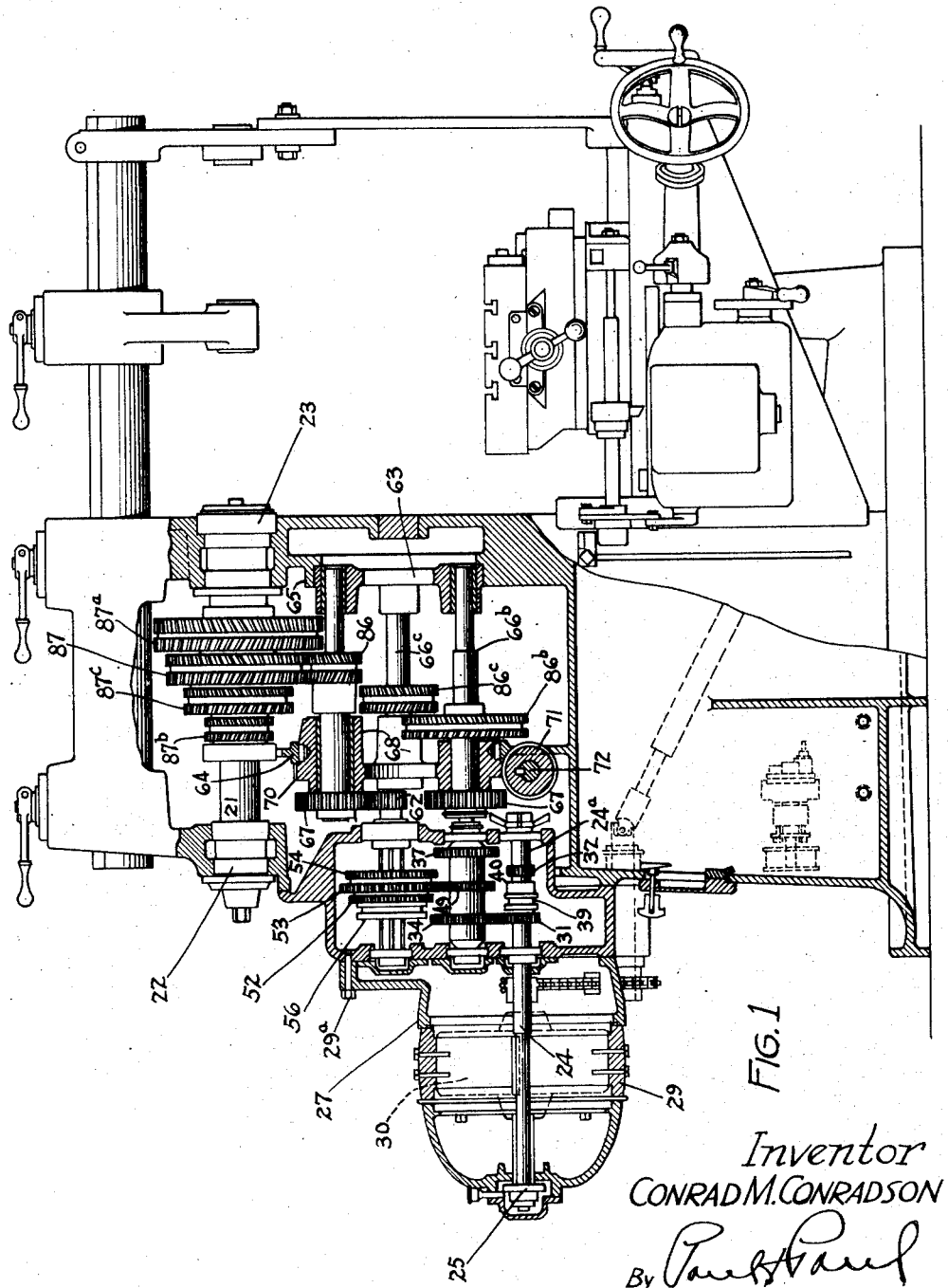
Figure 2:
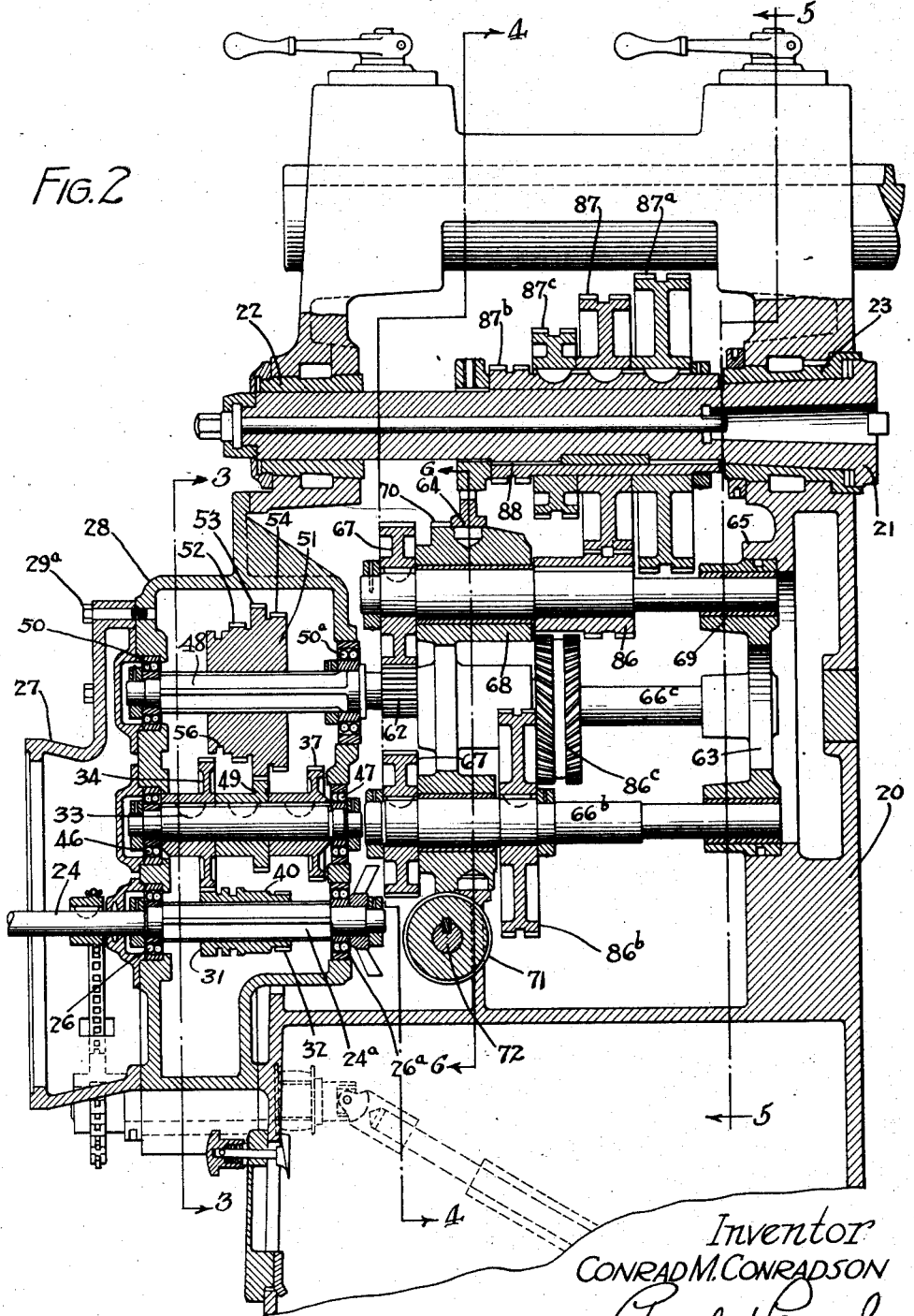

In the accompanying drawings forming part of this specification,

Figure 1 is a vertical longitudinal section of a milling machine embodying my invention, Figure 2 is a similar section on a larger scale of the main column of the machine, embodying the driving mechanism, Figure 3 is a transverse vertical section of the machine on the line 3—3 of Figure 2, Figure 3ª is a detail view of the gear shifter index and locking device, Figure 4 is a similar section on the line 4—4 of Figure 2, Figure 5 is a like section on the line 5—5 of Figure 2, Figure 6 is a section on a larger scale on the line 6—6 of Figure 2, illustrating the locking device for the drive speed change gearings.

The spindle drive.

Referring to Figures 1 to 6, which illustrate more particularly the main spindle driving mechanism, 20 is the main frame or column of the machine in the upper part of which the working spindle 21 is mounted adjustably in suitable bearings 22 and 23.

The primary motor shaft 24 from which power is transmitted to the spindle 21 is journaled in ball bearings 25 and 26 within a bonnet 27 attached to a gear housing 28, which in turn is securely fastened to the column 20 by bolts 28ª (see Figure 3). The bonnet 27 is provided with a motor base casting 29 to which an electric or other motor 30, indicated by dotted lines in Figure 1, may be attached and coupled directly to the shaft 24. The motor base 29 is interchangeable in the bonnet 27 with a pulley guard (not shown) and a belt-driven pulley (not shown) may be substituted on the shaft 24 as a motive power in place of the motor 30. The shaft 24 extends through the bearing 26 mounted in the gear housing 28 and is provided with a splined portion 24ª and a third ball bearing 26ª in the housing 28. Sliding gears 31 and 32 arranged upon the splined portion 24ª transmit power from the shaft 24 to an intermediate shaft 33 in a forward or reverse direction, as may be desired, by means of a gear 34 upon the shaft 33 meshing with the sliding gear 31 for forward rotation, and the gear 32 meshing with an idler gear 35, loosely journaled upon a stud 36, as shown in Figure 3, and meshing with a gear 37 upon the shaft 33 for reverse rotation.

A shifter arm 38, having shifter block connection to an annular groove 39 in the sliding gear collar 40, is secured upon a short rock shaft 41 mounted in bearings 42 in the housing 28 and is on the outside of the housing provided with an operating and indexing lever 43. A spring latch 44 upon the lever 43 is adapted to lock the lever in holes 45, 45ª and 45ᵇ in the housing 28, locking the sliding gears 31 and 32 in positions corresponding to forward rotation, neutral and reverse rotation of the intermediate shaft 33.

This shaft is mounted in ball bearings 46 and 47 and transmits power to the master transmission shaft 48 through the gears 34 and 37 and an intermediate gear 49, all keyed to the shaft 33. The shaft 48 is journaled in ball-bearings 50 and 50ª and upon its splined middle portion it carries a sliding gear spool 51, having gears 52, 53 and 54 adapted to be brought into mesh, one at a time, with the gears 34, 49 and 37 respectively. A shifter arm 55, having shifter block connection to an annular groove 56 in the gear spool 51, is secured to a short rock shaft 57, mounted in bearings 58 in the housing 28, and is on the outside of the housing provided with an operating and indexing lever 59. A spring latch 60 upon the lever 59 is adapted to lock the lever 59 in holes 61, 61$^a$, and 61$^b$, locking the gear spool 61 in positions to bring the gears 52, 53 and 54 in mesh with the corresponding gears 34, 49 and 37.

These gears are of different diameters and the rate of speed of the master shaft 48 will vary according to which one of the gears is thrown in mesh. The shaft 48 carries an overhanging master pinion 62 and a tumbler 63 mounted in bearings 64 and 65 carries a series of four planetary shafts 66, 66$^a$, 66$^b$ and 66$^c$, each shaft carrying a head gear 67 of like diameter and in positions to be brought into mesh successively with the master pinion 62 when the tumbler 63 is rotated. The tumbler shafts 66, 66$^a$, 66$^b$ and 66$^c$ are mounted in bearings 68 and 69 in the tumbler 63, planetarily arranged around its axis and preferably 90 degrees apart. The axis of the tumbler 63 is eccentric to the axis of the master shaft 48 to a degree which will operate to bring one of the gears 67 in mesh with the master gear 62 while the other three gears are out of mesh and inoperative. The tumbler 63 is provided with peripheral, helical or spiral gear teeth 70 (see Figures 2 and 4) and a spiral gear 71, upon a short shaft 72 is in constant mesh with the peripheral gear teeth 70 and adapted when rotated by the shaft 72, to turn the tumbler 90 degrees for one complete revolution of the shaft 72 and gear 71, the ratio of the gear being four to one. The shaft 72 is mounted in bearings 73 and is provided with an external indexing and locking lever 74 having a handle 75 and being rigidly secured to the shaft 72. The tumbler 63 is securely locked to the frame 20 in the four operating positions with the locking of the lever 74, so that the tumbler can not be unlocked except when the lever is also unlocked for the purpose of turning the tumbler 63. To this end four tapered sockets 76, 76$^a$, 76$^b$ and 76$^c$, (see Figure 6) are provided in the periphery of the tumbler, these sockets being preferably drilled and reamed in hardened steel blocks 77 tightly inserted in the tumbler. A locking pin 78, having a tapered end 79, a threaded portion 80, and a finger knob 81, is rotatively arranged in the handle 75 of the indexing lever 74. A steel sleeve 82 through which the pin 78 passes, has an internally threaded head 83 fitting the threaded portion 80 of the pin 78 and is tightly inserted in the frame 20. The pin 78 is screwed into the sleeve 82 until its tapered end 79 is locked in the socket in one of the steel blocks 77 and when it is desired to rotate the tumbler, the pin is unscrewed until released from the socket, after which the indexing lever may be turned the required number of revolutions to bring the desired tumbler shaft in operative position with respect to the master pinion 62 and locked in this position by again screwing the locking pin 78 into the respective tumbler socket.

The tumbler shafts 66, 66$^a$, 66$^b$, and 66$^c$ carry herringbone gears 86, 86$^a$, 86$^b$ and 86$^c$ respectively, keyed to the shafts and of different diameters (see Figures 2 and 5).

Upon the working spindle 21 is secured four herringbone gears 87, 87$^a$, 87$^b$ and 87$^c$ of diameters to correspond with the tumbler-gears 86, 86$^a$, 86$^b$ and 86$^c$, the smallest gear 87$^b$ being cut on a sleeve 88 keyed to the spindle 21 and the remaining gears being keyed to the sleeve 88. The diameters of the respective tumbler and spindle gears are proportioned so that when one of the tumbler head gears 67 is in mesh with the master pinion 62, the herringbone gear on the corresponding tumbler shaft will mesh with the herringbone gear on a line with it on the spindle 21 and the spindle will be revolved at a rate of speed corresponding to the ratio of these gears. Given a constant speed of the motor shaft 24, it will appear from the foregoing that twelve different speeds, both forward and reverse, may be obtained for the working spindle 21 and that no clutches but sliding and planetary tumbler gears are used in shifting to different speeds.

I claim as my invention:

1. The combination, with a drive shaft, of a revoluble tumbler having a plurality of gears and shafts therefor journaled at each end in said tumbler, a variable speed driving mechanism between said drive shaft and said tumbler, and a spindle having a plurality of gears mounted to engage successively the respective gears of said tumbler.

2. The combination with a suitable frame, of a drive shaft journaled therein, a revoluble tumbler having bearings in said frame, a series of shafts peripherally journaled in said tumbler at intervals and geared to said drive shaft to be operated successively thereby, means for revolving said tumbler, gears secured to the shafts of said tumbler, a working spindle and gears thereon adapted to mesh respectively with the gears of said shafts.

3. The combination with a shaft having a pinion thereon, of a revoluble tumbler eccentric with respect to said shaft and having suitable bearings, a plurality of planetary shafts mounted in said tumbler, head gears on said shafts meshing with said pinion successively, a spindle and gears thereon and gears of different sizes mounted on the shafts of said tumbler and meshing respectively with the opposite gears of said spindle.

4. The combination, with a revoluble tumbler having bearings and means for revolving and locking said tumbler, of gears mounted therein, a drive shaft having a pinion for successively engaging said gears as said tumbler is revolved, a plurality of herringbone gears of different sizes mounted in said tumbler between its bearings, a spindle, a corresponding number of herringbone gears mounted on said spindle and meshing successively with the herringbone gears of said tumbler as it is revolved.

5. The combination, with a frame, of a driving shaft mounted therein, a master shaft having variable speed driving connections with said driving shaft, a pinion on said master shaft, a tumbler having bearings in said frame, shafts having bearings in said tumbler and gears thereon to mesh successively with said pinion, a work spindle, and gears on said tumbler shafts intermediate to their ends meshing with gears on said workspindle.

6. The combination, with a driving shaft, of an intermediate shaft having a driving connection therewith, a master shaft having variable speed driving connections with said intermediate shaft, a pinion on said master shaft, a tumbler having a plurality of planetary shafts, a gear on each of said planetary shafts in position to be brought into mesh successively with said master pinion when the tumbler is rotated, a spindle, and driving gears connecting said planetary shafts with said spindle.

7. The combination, with a drive shaft, of an intermediate shaft geared thereto, a master shaft having a variable speed driving connection with said intermediate shaft, a pinion on said master shaft, a revoluble tumbler mounted eccentrically to the axis of said master shaft and having a plurality of planetary shafts and gears thereon to mesh successively with said master shaft pinion as said tumbler is revolved, a spindle, and variable speed driving connections between said spindle and said planetary shafts respectively.

8. The combination, with a driving shaft, of an intermediate shaft having a variable speed driving connection with said driving shaft, a master shaft having a variable speed driving connection with said intermediate shaft, a pinion on said master shaft, a revoluble tumbler and a plurality of planetary shafts mounted therein, gears on said planetary shaft mounted to mesh respectively with said master shaft pinion as said tumbler is revolved, means for locking said tumbler and spindle, and variable speed driving connections between said spindle and said planetary shafts.

9. The combination, with a driving shaft, of an intermediate shaft geared thereto, a master shaft having a variable speed driving connection with said intermediate shaft, a pinion mounted on said master shaft, a revoluble tumbler, a plurality of planetary shafts mounted therein, gears on said planetary shafts to mesh respectively with said pinion as said tumbler is revolved, said tumbler having peripheral spiral gear teeth, a spiral gear meshing with said teeth, a shaft for said spiral gear and an adjusting and locking lever mounted on said spiral gear shaft for holding said tumbler in its adjusted positions, and a spindle having gear connections with said planetary shafts.

10. The combination, with a drive shaft, of a master shaft having variable speed driving connections with said drive shaft, a pinion on said master shaft, a tumbler having bearings and planetary shafts mounted in said tumbler, gears on said planetary shaft, said tumbler being mounted eccentrically with respect to said master shaft, and the gears of said planetary shafts meshing successively with said pinion and spindle, and driving connections between said planetary shaft and said spindle.

11. The combination, with a frame, of a driving shaft mounted therein, a master shaft having variable speed driving connection with said driving shaft, a pinion on said master shaft, a tumbler in the form of a skeleton cylinder journaled in said frame, planetary shafts peripherally mounted in said tumbler, gears on said planetary shafts arranged to mesh successively with said pinion, a spindle, and driving connections between said planetary shafts and said spindle.

12. The combination, with a driving shaft, of a master shaft having a variable speed driving connection therewith, a pinion on said master shaft, a tumbler having bearings, planetary shafts mounted in said tumbler, gears on said planetary shafts mounted to mesh successively with said pinion, a spindle, gears mounted on said planetary shafts intermediate to their ends and the bearings of said tumbler and having driving connections with said spindle.

13. The combination, with a driving shaft, of a master shaft having variable speed driving connections therewith, a pinion mounted on said master shaft, a tumbler comprising heads and peripherally arranged planetary shafts connecting said heads, said tumblers having bearings and gears on said shafts to mesh with said master shaft pinion as said tumbler is revolved, a spindle, herringbone gears of varying sizes mounted on said spindle and corresponding gears of varying sizes mounted on said panetary shaft to mesh successively with the corresponding gears of said spindle.

14. The combination, with a frame, of a driving shaft journaled therein, a master shaft having a variable speed driving connection with said driving shaft, a pinion on said master shaft, a skeleton tumbler mounted in said frame and at one end of said master shaft and adjacent said pinion, planetary shafts having bearings at each end in said tumbler, gears mounted on said planetary shafts and meshing with the pinion of said master shaft, a spindle, and variable speed driving connections between said spindle and said planetary shafts respectively.

15. The combination, with a column, of a gear housing mounted on one side thereof, a bonnet secured to said gear housing, a motor base enclosed by said bonnet, a drive shaft journaled in said bonnet, a master shaft having variable speed driving connections with said driving shaft, a pinion on said master shaft, a tumbler having bearings in said column, planetary shafts journaled in said tumbler, gears mounted on said shafts to mesh successively with said pinion as said tumbler is revolved, a spindle adjacent said tumbler, and variable speed driving connections between said spindle and said planetary shafts.

16. The combination, with a column having a gear housing, of a driving shaft mounted in said column, an intermediate shaft above said driving shaft, a master shaft above said intermediate shaft, variable speed driving gears mounted to slide on said driving shaft and said master shaft, gears on said intermediate shaft for engagement respectively with the gears of said driving and master shafts, a pinion on said master shaft, a tumbler journaled in said column, planetary shafts mounted in said tumbler, gears mounted on said shafts to mesh with the pinion of said master shaft, a spindle, and variable speed driving connections between said spindle and said planetary shafts for operating said spindle at different speeds.

17. The combination, with a drive shaft, of a master shaft having a pinion thereon, a variable speed driving connection between said drive shaft and said master shaft, a tumbler having a plurality of bearings, shafts mounted in said tumbler and having gears to mesh successively with said pinion, a spindle, and variable speed driving connections between said spindle and said tumbler shafts intermediate to the bearings of said shafts in said tumbler.

18. The combination, with a drive shaft, of a revolving tumbler having a plurality of bearings, shafts mounted in said tumbler and having variable speed driving connections with said drive shaft, a spindle, and variable speed driving connections between said tumbler shafts and said spindle.

19. The combination with a frame, of a tumbler journaled therein, shafts mounted in said tumbler and having driving connections with said drive shaft, a working spindle having variable speed driving connections with said shafts becoming operative successively as said tumbler is rotated, means having an operating lever for rotating said tumbler and a locking pin carried by said lever and adapted to enter sockets in said tumbler for locking it in its adjusted positions, said pin preventing the movement of said lever to rotate said tumbler until it is released.

In witness whereof, I have hereunto set my hand this 8th day of March, 1920.

CONRAD M. CONRADSON.